US008823839B2

(12) United States Patent
Hsu et al.

(10) Patent No.: US 8,823,839 B2
(45) Date of Patent: Sep. 2, 2014

(54) IMAGE SYSTEM AND DENOISING METHOD THEREOF

(75) Inventors: En Feng Hsu, Hsin-Chu (TW); Ching Lin Chung, Hsin-Chu (TW)

(73) Assignee: Pixart Imaging Inc, Hsin-Chu County (TW)

(*) Notice: Subject to any disclaimer, the term of this patent is extended or adjusted under 35 U.S.C. 154(b) by 226 days.

(21) Appl. No.: 13/371,567

(22) Filed: Feb. 13, 2012

(65) Prior Publication Data
US 2012/0212652 A1 Aug. 23, 2012

(30) Foreign Application Priority Data

Feb. 18, 2011 (TW) .............................. 100105450 A (51) Int. Cl.
*H04N 5/217* (2011.01)

(52) U.S. Cl.
USPC ............ 348/241; 348/243; 348/246; 348/247

(58) Field of Classification Search
USPC ................ 348/241, 243, 222.1, 227.1–229.1, 348/294–324; 250/208.1; 257/290–292
See application file for complete search history.

(56) References Cited

U.S. PATENT DOCUMENTS 4,680,624 A * 7/1987 Murakami .................... 348/256

* cited by examiner

*Primary Examiner* — Yogesh Aggarwal
(74) *Attorney, Agent, or Firm* — Lowe Hauptman & Ham, LLP (57) ABSTRACT

There is provided a denoising method of an image system that detects a brightness variation cycle of ambient light sources, records a brightness variation of at least one noise area within the brightness variation cycle and compensates the brightness variation from current images thereby removing interference from the ambient light sources. There is further provided an image system.

24 Claims, 5 Drawing Sheets

IMAGE SYSTEM AND DENOISING METHOD THEREOF

CROSS REFERENCE TO RELATED APPLICATION

This application claims the priority benefit of Taiwan Patent Application Serial Number 100105450, filed on Feb. 18, 2011, the full disclosure of which is incorporated herein by reference.

BACKGROUND

1. Field of the Disclosure

This disclosure generally relates to an image system and denoising method thereof and, more particularly, to an image system and a denoising method capable of removing the flicker phenomenon caused by ambient light sources.

2. Description of the Related Art

In present days the image capture technology has been widely applied to various kinds of electronic products, such as the optical touch system, optical distance measuring system or other optical applications that can perform corresponding processes according to acquired images.

Generally speaking, the optical applications mentioned above utilize at least one image sensor to acquire images and perform post-processing of the acquired images to calculate the variation of image content between two images. However, as the image sensor can only detect the intensity variation, the images acquired by the image sensor can be directly influenced when the brightness of ambient light sources changes with time thereby degrading the operation accuracy of the system.

Particularly, when the brightness of ambient light sources does not change in a simple cycle or ambient light sources illuminating in different brightness variation cycles exist in the operation environment, interference caused thereby can not be easily removed so that the operation accuracy of the image system can not be effectively improved.

Accordingly, it is necessary to provide an image system and denoising method thereof that can remove or can at least significantly reduce the flicker problem caused by ambient light sources mentioned above.

SUMMARY

It is an object of the present disclosure to provide an image system and a denoising method thereof capable of removing flicker in an image system due to the brightness variation of ambient light sources.

The present disclosure provides an image system includes at lest one image sensor and a processing unit. The image sensor is configured to continuously acquire images. The processing unit is for determining at least one noise area according to a plurality of images acquired by the image sensor, and recording a brightness variation parameter and a phase parameter of the noise area within a reference brightness variation cycle to accordingly compensate a brightness of the noise area in current images.

The present disclosure further provides a dinoising method of an image system for removing interference from ambient light having a brightness variation cycle. The denoising method including the steps of: acquiring two images using an image sensor; calculating a difference of the two images to determine at least one noise area in the images; recording brightness variations of the noise area within a reference brightness variation cycle; and acquiring two current images and calculating a current image difference, retrieving the brightness variation of the noise area of two neighboring images in the reference brightness variation cycle corresponding to sampling phases of the two current images in the brightness variation cycle, and subtracting the retrieved brightness variation from the current image difference.

The present disclosure further provides a denoising method of an image system including the steps of: acquiring, using an image sensor, a plurality of images to determine at least one noise area; recording a brightness variation parameter and a phase parameter of the noise area within a reference brightness variation cycle; and compensating a brightness of the noise area in current images acquired by the image sensor according to the brightness variation parameter and the phase parameter.

In an aspect, when a brightness variation frequency of ambient light is unknown, the denoising method of the present disclosure further includes the step of recording a brightness variation of the noise area for a predetermined time interval so as to identify a brightness variation cycle of the ambient light.

In an aspect, the brightness variation parameter is a brightness of the noise area in each of the images acquired by the image sensor within the reference brightness variation cycle, or a brightness difference or a brightness ratio of the brightness of the noise area and an average brightness of each of the images; and the phase parameter is a sampling phase of each of the images acquired by the image sensor within the reference brightness variation cycle.

In an aspect, the step of acquiring, using an image sensor, a plurality of images to determine at least one noise area is to identify an image area in the images having a fixed brightness variation frequency as the noise area, or to identify an image area in the images having a brightness variation frequency identical to a predetermined brightness variation frequency as the noise area.

In the image system and the denoising method of the present disclosure, interference from ambient light sources is removed by means of detecting a brightness variation cycle of the ambient light sources and recording a brightness variation of at least one noise area within the brightness variation cycle, and compensating the brightness variation in current images.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is related to the elimination of the impact on an image system from ambient light sources illuminating in a brightness variation cycle. Each brightness variation cycle of the ambient light sources outside the image system may include two brightness intervals having different brightness variations or identical brightness variations. In addition, the brightness variation cycle may be determined according to an AC frequency of the power system coupled to the ambient light sources.

Figure 1:
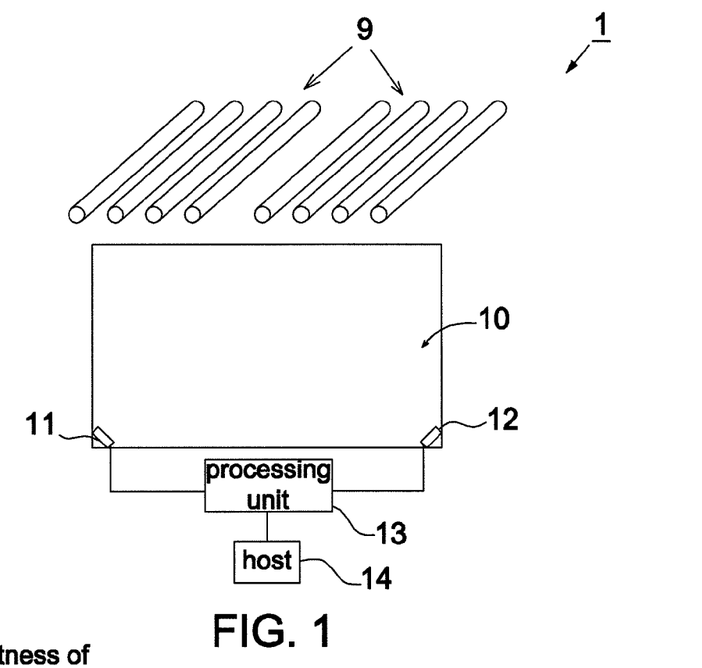
FIG. 1 shows a schematic diagram of the image system according to an embodiment of the present disclosure.

Please refer to FIG. 1, it shows a schematic diagram of the image system according to an embodiment of the present disclosure, and the image system is shown as an optical touch system. It should be mentioned that although the image system is shown as an optical touch system in FIG. 1, the present disclosure is not limited thereto. The image system may be an optical distance measuring system or any system that performs the system control according to images acquired by at least one image sensor. In addition, an ambient light source 9, e.g. a set of fluorescent lamp tubes, is farther shown in FIG. 1 to denote an operation environment of the image system of the present disclosure.

The image system 1 includes a touch surface 10, two image sensors 11 and 12, and a processing unit 13. The touch surface 10 is served as an interaction interface between a user (not shown) and the image system 1, and may be made of suitable materials. A user may use his or her finger (or fingers) or a touch object to contact or approach the touch surface 10 and operate thereon so as to perform the system control. The image sensors 11 and 12 are configured to acquire images looking across the touch surface 10 and containing the image of touch object approaching or contacting the touch surface 10. The image sensors 11 and 12 may be an image sensing device employing a CCD image sensor or a CMOS image sensor. The processing unit 13 receives images from the image sensors 11 and 12 and performs post-processing according the variation of image content of the received images so as to calculate at least one system parameter, such as a moving vector and/or an icon selection, to be sent to a host 14, wherein the processing unit 13 may be a digital signal processor or other processors capable of processing image data. The calculation of the system parameter may use conventional methods and thus details thereof will not be repeated herein.

When the ambient light source 9 is located inside field of views of the image sensors 11 and 12, an image of the ambient light source 9 will be included in the images acquired by the image sensors 11 and 12. If the processing unit 13 calculates the system parameter using the images containing the image of the ambient light source 9, calculation results can be interfered especially when a brightness of the ambient light source 9 changes with time. Therefore, this disclosure provides an image system and a denoising method that can eliminate interference from the ambient light source 9 while calculating the system parameter. In addition, it should be mentioned that a number and positions of the image sensors are not limited to those shown in FIG. 1 and may be determined according to different applications without any particular limitation.

Figure 2A:
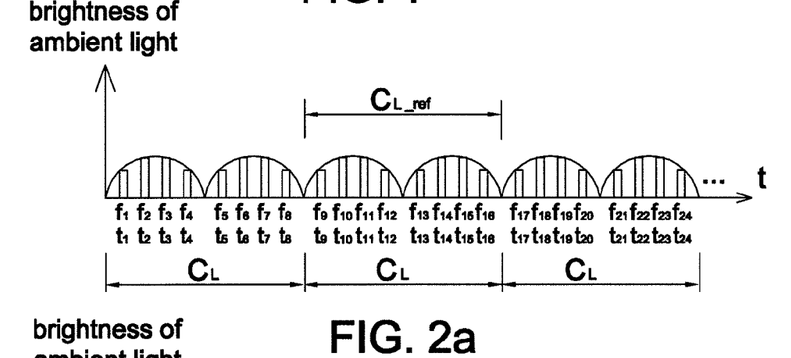
FIGS. 2a to 2b show schematic diagrams of the brightness variation of ambient light sources and the image acquisition of an image sensor.
Figure 2B:
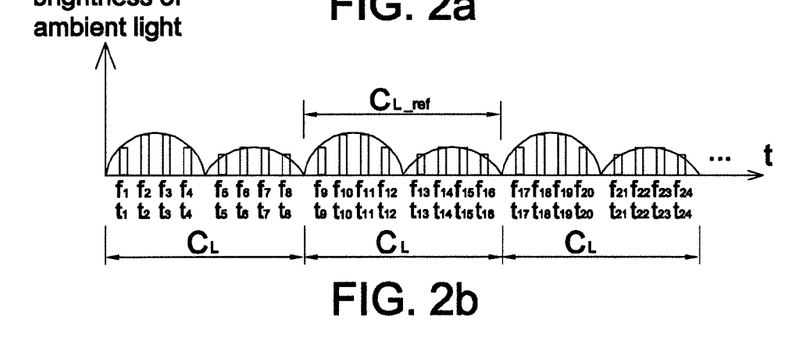

Please refer to FIGS. 2a and 2b, they show schematic diagrams of the brightness variation of the ambient light source 9 with time, wherein as the ambient light source 9 is coupled to an AC power system, the brightness variation of the ambient light source 9 may have a brightness variation cycle $C_L$. FIG. 2a shows that one brightness variation cycle $C_L$ includes two brightness intervals having identical brightness variations while FIG. 2b shows that one brightness variation cycle $C_L$ includes two brightness intervals having different brightness variations. A reason that causes the non-uniform brightness variation of the fluorescent lamp tubes, especially two ends thereof, as shown in FIG. 2b is the direction of an AC exciting current. For example, in a half cycle that the AC exciting current flows from one end to the other, the end that the AC current flows in can have a higher brightness but the end that the AC current flows out can have a lower brightness. Therefore, respective brightness variations of the two ends of the fluorescent lamp tubes are different in different half cycles of one brightness variation cycle $C_L$ as shown in FIG. 2b. The infrared light emitted by the fluorescent lamp tubes can especially have obvious non-uniform brightness variation due to different directions of the AC exciting current. The image system and the denoising method of the present disclosure is able to eliminate interference caused by ambient light sources having the brightness variations as shown in FIGS. 2a and 2b.

Details of the denoising method of an image system according to the present disclosure will be illustrated hereinafter. The denoising method is to detect a brightness variation cycle of ambient light sources, to record a brightness variation of at least one noise area within the brightness variation cycle, and to compensate the brightness variation from current images thereby removing interference from the brightness variation of the ambient light sources.

Figure 3:
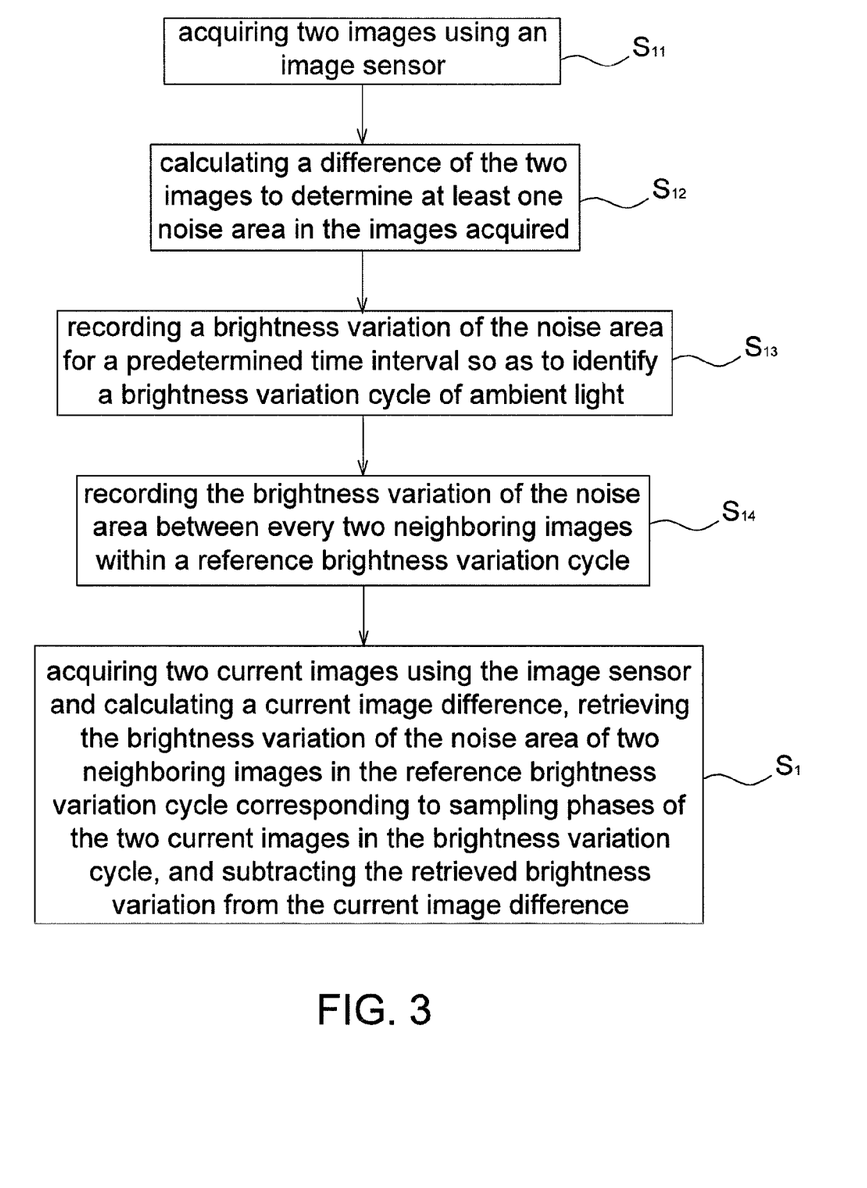
FIG. 3 shows a flow chart of the denoising method according to the first embodiment of the present disclosure.

Please refer to FIG. 3, it shows a flow chart of the denoising method of an image system according to the first embodiment of the present disclosure. The denoising method includes the steps of: acquiring two images using an image sensor (Step $S_{11}$); calculating a difference of the two images to determine at least one noise area in the images acquired (Step $S_{12}$); recording a brightness variation of the noise area for a predetermined time interval so as to identify a brightness variation cycle of ambient light (Step $S_{13}$); recording the brightness variation of the noise area between every two neighboring images within a reference brightness variation cycle (Step $S_{14}$); and acquiring two current images using the image sensor and calculating a current image difference, retrieving the brightness variation of the noise area of two neighboring images in the reference brightness variation cycle corresponding to sampling phases of the two current images in the brightness variation cycle, and subtracting the retrieved brightness variation from the current image difference (Step $S_{15}$).

The denoising method of an image system according to the present disclosure performs the steps $S_{11}$ to $S_{14}$ for example, but not limited to, each time the system being activated (e.g. in starting procedure) so as to record the brightness variation within a reference brightness variation cycle of the ambient light source 9 in the processing unit 13. Then in normal operation, current images are compensated by the brightness variation of the ambient light source 9 at corresponding sampling phases in the reference brightness variation cycle according to the step $S_{15}$ so as to remove interference from the ambient light source 9.

Please refer to FIGS. 2a to 4c, FIGS. 4a to 4c show schematic diagrams of the denoising method of an image system according to the embodiment of the present disclosure. The image sensors 11 and 12 continuously acquire images with a sampling frequency. In order to perform the denoising method of the present disclosure, the sampling frequency is preferably larger than a reciprocal of the brightness variation cycle (i.e. a brightness variation frequency) of the ambient light source 9. As shown in FIGS. 2a and 2b, the image sensors 11 and 12 acquire, for example, eight images $f_1$ to $f_8$, $f_9$ to $f_{16}$, $f_{17}$ to $f_{24}$ . . . in each brightness variation cycle $C_L$ respectively, but not limited thereto.

First, each of the image sensors 11 and 12 continuously acquires two images respectively, e.g. $f_1$ and $f_2$ (referring to FIGS. 2a, 2b and 4a), and each image is assumed to contain images of ambient light source $I_{90}$ having a periodical brightness variation and an image of ambient light source $I_{80}$ having a fixed brightness (Step $S_{11}$). After receiving the images $f_1$ and $f_2$, the processing unit 13 calculates a difference of the two images $f_1$ and $f_2$ to obtain a differential image $(f_1-f_2)$, wherein since the image of ambient light source $I_{80}$ has a fixed brightness in the two images $f_1$ and $f_2$, the interference thereof can be removed by this differential operation. However, it is clear from FIGS. 2a and 2b that since the images of ambient light source $I_{90}$ have different brightness in the two images $f_1$ and $f_2$, the differential image $(f_1-f_2)$ still contains at least a part of the images of ambient light source $I_{90}$.

Figure 4A:
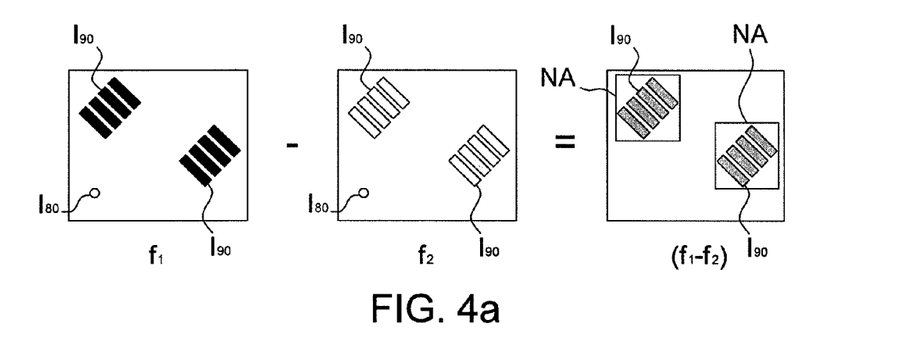
FIGS. 4a to 4c show schematic diagrams of the denoising method according to the embodiment of the present disclosure.
Figure 4B:
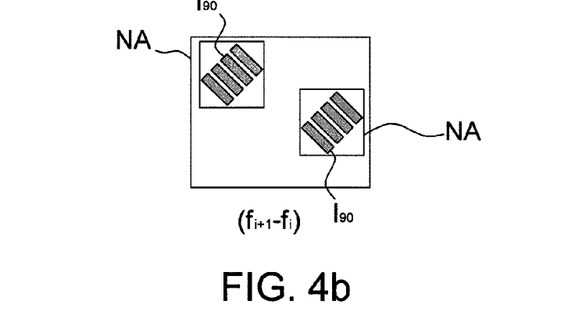

Next, the processing unit 13 may determine at least one noise area NA according to the differential image $(f_1-f_2)$, e.g. two noise areas NA are shown herein (Step $S_{12}$). In addition, it should be mentioned that although the noise areas NA in FIGS. 4a and 4b are shown as rectangles, the present disclosure is not limited thereto. The noise area NA of the present disclosure may be defined as any suitable shape as long as an area thereof can cover the image of ambient light source having a periodical brightness variation.

Next, each of the image sensors 11 and 12 continuously acquires images with the same sampling frequency respectively, e.g. acquiring images $f_3$, $f_4$ . . . as shown in FIGS. 2a and 2b. The processing unit 13 records a brightness variation of the noise area NA for a predetermined time interval, wherein the predetermined time interval is preferably longer than an AC cycle of the power system; for example, but not limited to, at least longer than (1/60) or (1/50) second. In addition, the recorded brightness variation may be brightness values of the noise area NA in each of the images acquired by the image sensor 11 and 12 within the predetermined time interval, e.g. the brightness values of the noise area NA in each of the images $f_1$ to $f_8$. The recorded brightness variation may also be a brightness difference of the noise area NA between every two neighboring images acquired by the image sensors 11 and 12 within the predetermined time interval, e.g. the brightness difference of the noise area NA between images $f_1$ and $f_2$, the brightness difference of the noise area NA between images $f_2$ and $f_3$ . . . . The processing unit 13 further identifies a brightness variation cycle of the ambient light source 9 according to the recorded brightness variation, e.g. identifying the brightness variation cycle according to a repeatability of the brightness variation (Step $S_{13}$). In addition, it should be mentioned that in order to identify the brightness variation cycle of the ambient light source 9, the predetermined time interval may be as long as necessary, e.g. longer than an interval of two brightness variation cycles. In one embodiment, the Steps $S_{12}$ and $S_{13}$ may be performed simultaneously.

In addition, the processing unit 13 may further identify whether the brightness of the ambient light source 9 varies periodically according to the brightness variation of the noise area NA recorded within the predetermined time interval. If the brightness of the ambient light source 9 does not vary periodically, the processing unit 13 may directly calculate a system parameter according to the images successively acquired by the image sensors 11 and 12 without performing the Steps $S_{14}$ to $S_{15}$, e.g. determining the system parameter according to two current images acquired by the image sensors 11 and 12. On the other hand, if the brightness of the ambient light source 9 does vary periodically, the processing unit 13 identifies the brightness variation cycle $C_L$ and then performs the Steps $S_{14}$ to $S_{15}$.

Next, each of the image sensors 11 and 12 continuously acquires images with the same sampling frequency respectively. The processing unit 13 records brightness variations of the noise area between every two neighboring images (e.g. including images $f_9$ to $f_{16}$) within a reference brightness variation cycle $C_{L\_ref}$, e.g. recording the brightness variation of the noise area NA in the differential image $(f_{i+1}-f_i)$ as shown in FIG. 4b, wherein i=9 to 15 herein. The recorded brightness variations of the noise area NA between every two neighboring images may be stored in a memory unit (not shown) included in or outside the processing unit 13. In one embodiment, the recorded brightness variations of the noise area NA between every two neighboring images may be the brightness variation of the noise area NA in every differential image $(f_{+1}-f_i)$ within the reference brightness variation cycle $C_{L\_ref}$. In another embodiment, the recorded brightness variations of the noise area NA between every two neighboring images may be a brightness difference or a brightness ratio of a reference brightness variation of the noise area NA between any two neighboring images with respect to the brightness variations of the noise area NA between other two neighboring images within the reference brightness variation cycle $C_{L\_ref}$. The reference brightness variation may be a maximum brightness variation of the noise area NA between two neighboring images within the reference brightness variation cycle $C_{L\_ref}$, e.g. the brightness variation of the noise area NA in the differential image $(f_{10}-f_9)$ has the maximum brightness variation herein, but it is able to select the brightness variation between any two neighboring images as the reference brightness variation in addition to the maximum brightness variation. If the maximum brightness variation is selected as the reference brightness variation, the brightness variations of the noise area NA between other two neighboring images with respect to the reference brightness variation may have a ratio smaller than or equal to one. In an alternative embodiment, the recorded brightness variations of the noise area NA may include an average brightness of the noise area NA between every two neighboring images within the reference brightness variation cycle $C_{L\_ref}$, e.g. an average of the brightness variations of the noise area NA in the differential images $(f_{10}-f_9)$, $(f_{11}-f_{10})$ . . . $(f_{16}-f_{15})$, and a brightness ratio of the brightness variations of the noise area NA between every two neighboring images with respect to the average brightness variation. Herein, the brightness ratio of the brightness variations of the noise area NA between every two neighboring images with respect to the average brightness variation may be larger than, equal to or smaller than 1.

Now, the processing unit 13 has recorded an identified brightness variation cycle $C_L$ of the ambient light source 9 and the brightness variation within the brightness variation cycle $C_L$, and these steps may be performed each time the system being activated. Next, in normal operation of the image system 1, current images acquired by the image sensor may be compensated according to the recorded brightness variation of the ambient light source 9 so as to eliminate flicker caused by the interference of the ambient light source 9.

Figure 4C:
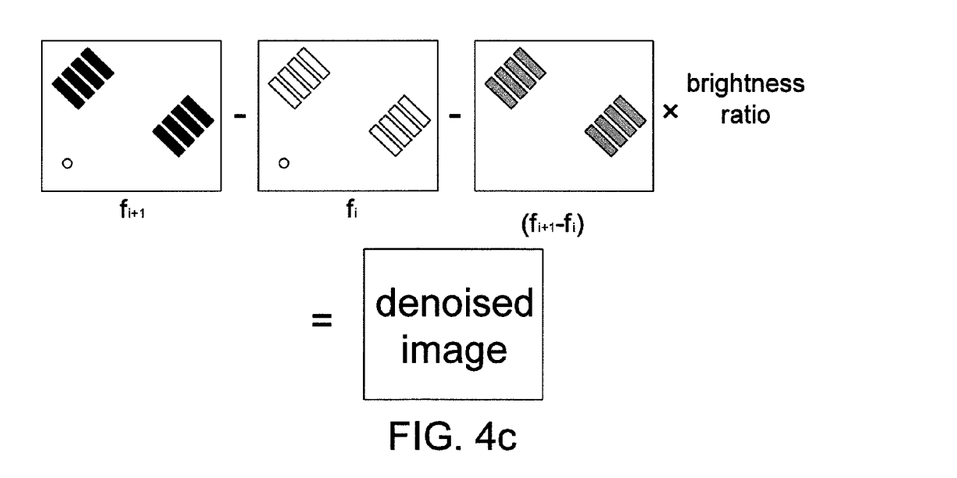

In normal operation, the processing unit 13 calculates a current image difference of two current images acquired by each of the image sensors 11 and 12, and then retrieves the brightness variation of the noise area NA of two neighboring images in the reference brightness variation cycle $C_{L\_ref}$ corresponding to sampling phases (or sampling times) of the two current images in the brightness variation cycle $C_L$, and then subtracts the retrieved brightness variation from the current image difference (Step $S_{15}$). For example as shown in FIG. 4c, it is assumed that each of the image sensors 11 and 12 acquires two current images $F_{17}$ (i.e. $F_i$) and $F_{18}$ (i.e. $F_{i+1}$). The processing unit 13 calculates a difference of the two current images $F_{17}$ and $F_{18}$, and then subtracts the difference thereof by the brightness variation of the noise area NA of two neighboring images (e.g. images $f_9$ and $f_{10}$ herein) having sampling phases in the reference brightness variation cycle $C_{L\_ref}$ corresponding to sampling phases of the two current images (e.g. images $f_{17}$ and $f_{18}$ herein) acquired in the brightness variation cycle $C_L$ (i.e. the first and second images in an brightness variation cycle $C_L$ herein) to obtain a denoised image. If the processing unit 13 has defined the brightness variation of the noise area NA between the images $f_9$ and $f_{10}$ as the reference brightness variation and recorded brightness ratios of the brightness variations of the noise area NA between other two neighboring images with respect to the reference brightness variation, the brightness ratio of the two current images is 1 herein. In this manner, interference of the ambient light source 9 can be totally removed.

Figure 5:
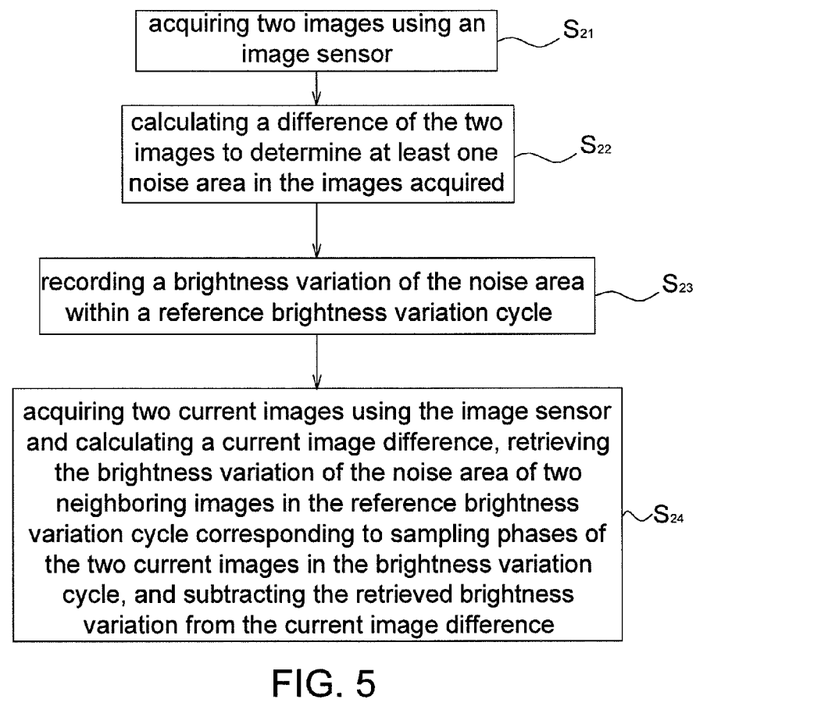
FIG. 5 shows a flow chart of the denoising method according to the second embodiment of the present disclosure.

In addition, if the brightness variation cycle of the ambient light source 9 has been known previously, the Step $S_{13}$ of recording a brightness variation of the noise area for a predetermined time interval so as to identify a brightness variation cycle of ambient light may not be performed. Herein, the denoising method of an image system according to the second embodiment of the present disclosure may include the steps of: acquiring two images using an image sensor (Step $S_{21}$); calculating a difference of the two images to determine at least one noise area in the images acquired (Step $S_{22}$); recording a brightness variation of the noise area within a reference brightness variation cycle (Step $S_{23}$); and acquiring two current images using the image sensor and calculating a current image difference, retrieving the brightness variation of the noise area of two neighboring images in the reference brightness variation cycle corresponding to sampling phases of the two current images in the brightness variation cycle, and subtracting the retrieved brightness variation from the current image difference (Step $S_{24}$) as shown in FIG. 5. Details of this embodiment are similar to those of the first embodiment and thus will not be repeated herein. The image system of the second embodiment of the present disclosure may further include a selective switch to be operated by a user for selecting the brightness variation cycle of the ambient light source 9 according to a current AC frequency of the power system.

In another embodiment, the way of identifying the noise area NA and recording the brightness variation of the noise area NA within one reference brightness variation cycle $C_{L\_ref}$ may use other methods and is not limited to those disclosed in the above embodiments. Another way to identify the noise area NA and to record the brightness variation of the noise area NA within one reference brightness variation cycle $C_{L\_ref}$ will be illustrated hereinafter, but the present disclosure is not limited thereto.

Figure 7:
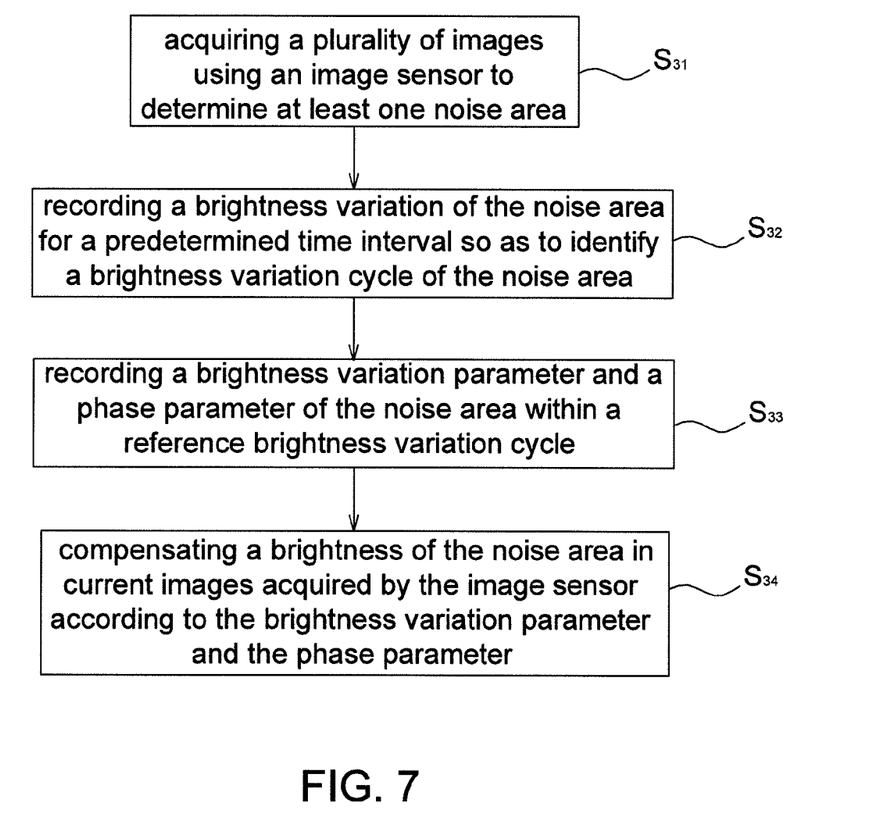
FIG. 7 shows a flow chart of the denoising method according to the third embodiment of the present disclosure.

Please refer to FIG. 7, the denoising method of an image system according to the third embodiment of the present disclosure includes the steps of: acquiring a plurality of images using an image sensor to determine at least one noise area (Step $S_{31}$); recording a brightness variation parameter and a phase parameter of the noise area within a reference brightness variation cycle (Step $S_{33}$); and compensating a brightness of the noise area in current images acquired by the image sensor according to the brightness variation parameter and the phase parameter (Step $S_{34}$).

For example, if an AC frequency of the power system coupled to the ambient light source 9 is previously known (e.g. 50 Hz or 60 Hz), the processing unit 13 may identify whether there is any area in the plurality of images acquired by the image sensors 11 and 12 having a brightness variation frequency identical to a predetermined frequency (e.g. the AC frequency of the power system) so as to identify at least one noise area. In addition, if the AC frequency of the power system coupled to the ambient light source 9 is not known, the processing unit 13 may identify whether there is any area in the plurality of images acquired by the image sensors 11 and 12 having a fixed brightness variation frequency so as to identify at least one noise area (Step $S_{31}$). In other words, the noise area of the present disclosure is not necessary to be identified according to a difference between two images. It should be mentioned that the method of identifying the noise area in an image is not limited to those disclosed in the present disclosure. The spirit of the present disclosure is to previously record the brightness variation of at least one noise area for being utilized in the post-processing, and the method of determining the noise area dose not have any particular limitation.

For example please refer to FIGS. 2a and 2b again, after identifying the noise area NA, the processing unit 13 records a brightness variation of the noise area NA in every image (e.g. $f_9$ to $f_{16}$) within the reference brightness variation cycle $C_{L\_ref}$, e.g. recording a brightness value of the noise area NA in every image or recording a brightness difference or a brightness ratio of a brightness value of the noise area NA in each image with respect to an average brightness of the same image including or excluding the noise area NA to be served as the brightness variation parameter. Meanwhile, the processing unit 13 also records phase parameters $t_9$ to $t_{16}$ respectively associated with the images $f_9$ to $f_{16}$, i.e. recording a sampling phase (or sampling time) of every image acquired within the reference brightness variation cycle $C_{L\_ref}$ (Step $S_{33}$).

Figure 6:
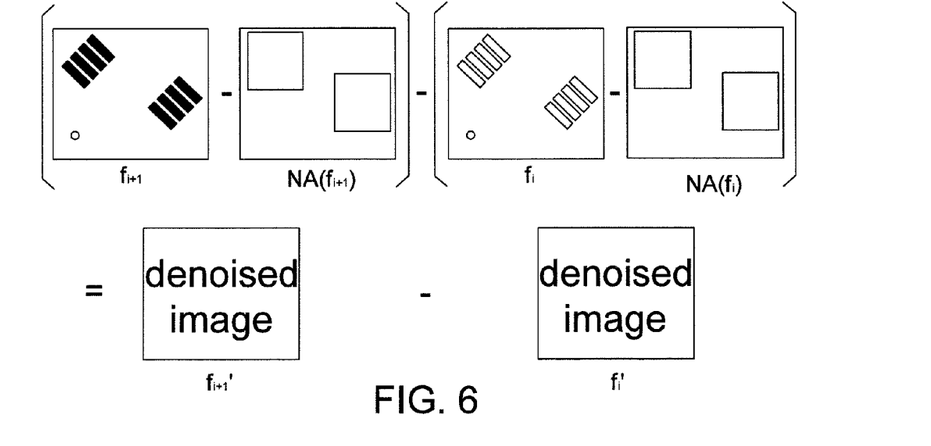
FIG. 6 shows another schematic diagram of the denoising method according to the embodiment of the present disclosure.

For example, each time a current image being acquired, the recorded brightness value of the noise area NA corresponding to a sampling phase of the current image is subtracted from the current image and the post-processing will then be performed. For example refer to FIG. 6, when each of the image sensors 11 and 12 acquires an image $f_i$ at a first time $t_i$, the processing unit 13 subtracts the image $f_i$ by the recorded brightness variation parameter $NA(f_i)$ of the noise area NA associated with the image $f_i$ so as to obtain a first denoised image V. Each of the image sensors 11 and 12 acquires an image $f_{i+1}$ at a second time $t_i+_i$, the processing unit 13 subtracts the image $f_{i+1}$ by the recorded brightness variation parameter $NA(f_{i+1})$ of the noise area NA associated with the image $f_{i+1}$ so as to obtain a second denoised image $f_{i+1}'$. Next, the processing unit 13 may perform the post-processing according to the second denoised image $f_{i+1}'$ and the first denoised image $f_i'$ (Step $S_{34}$). It is appreciated that if the recorded brightness variation parameters are the brightness difference or brightness ratio and the average brightness, the brightness variation parameter $NA(f_i)$ and $NA(f_{i+1})$ in FIG. 6 should be a product of the average brightness and brightness ratio or an addition of the average brightness and brightness difference.

In the third embodiment, the brightness variation frequency of ambient light sources may be previously known, and the implementation thereof is similar to that of the first embodiment but differs in the method of identifying the noise area NA and recording the brightness variation of the noise area NA.

If the brightness variation frequency of ambient light sources can not be known previously, the third embodiment of the present disclosure may further include the step of: recording a brightness variation of the noise area for a predetermined time interval so as to identify a brightness variation cycle of the noise area (Step $S_{32}$); wherein the identification method herein is similar to that in the first embodiment (i.e. Step $S_{13}$) and thus details thereof will be repeated again.

As mentioned above, the conventional image system is not able to totally remove the negative impact from ambient light sources, especially when the ambient light sources have a complicated brightness variation. Therefore, the present disclosure further provides an image system (FIG. 1) and denoising method thereof (FIGS. 3, 5 and 7) in which the flicker caused by ambient light sources having complicated brightness variation with time can also be effectively eliminated thereby increasing the accuracy of the system operation.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image system, comprising:
    at least one image sensor configured to continuously acquire images; and
    a processing unit configured to determine at least one noise area according to the images acquired by the image sensor, and record a brightness variation parameter and a phase parameter of the noise area within a reference brightness variation cycle to accordingly compensate a brightness of the noise area in current images, wherein
    the brightness variation parameter is one selected from the group consisting of
        (i) a brightness value of the noise area in each of the images acquired by the image sensor within the reference brightness variation cycle,
        (ii) a brightness difference of the brightness value of the noise area with respect to an average brightness value in each of the images acquired by the image sensor within the reference brightness variation cycle; and
        (iii) a brightness ratio of the brightness value of the noise area with respect to the average brightness value in each of the images acquired by the image sensor within the reference brightness variation cycle; and
    the phase parameter is a sampling phase of each of the images acquired by the image sensor within the reference brightness variation cycle.

2. The image system as claimed in claim 1, wherein the processing unit is configured to identify an image area in the images having a fixed brightness variation frequency as the noise area, or identify an image area in the images having a brightness variation frequency identical to a predetermined brightness variation frequency as the noise area.

3. The image system as claimed in claim 1, wherein the processing unit is further configured to record a brightness variation of the noise area for a predetermined time interval so as to identify a brightness variation cycle of ambient light.

4. The image system as claimed in claim 3, wherein after recording the brightness variation of the noise area for the predetermined time interval, the processing unit is further configured to identify whether a brightness of the ambient light varies periodically according to the brightness variation of the noise area recorded within the predetermined time interval.

5. A denoising method of an image system, for removing interference from ambient light having a brightness variation cycle, the denoising method comprising the steps of:
    acquiring two images using an image sensor;
    calculating a difference of the two images to determine at least one noise area in the images;
    recording a brightness variation of the noise area within a reference brightness variation cycle; and
    acquiring two current images and calculating a current image difference, retrieving the brightness variation of the noise area of two neighboring images in the reference brightness variation cycle corresponding to sampling phases of the two current images in the brightness variation cycle, and subtracting the retrieved brightness variation from the current image difference.

6. The denoising method as claimed in claim 5, further comprising: recording a brightness variation of the noise area for a predetermined time interval so as to identify the brightness variation cycle.

7. The denoising method as claimed in claim 6, wherein in the step of recording a brightness variation of the noise area, a brightness value of the noise area in every image or a brightness difference of the noise area between every two images acquired by the image sensor within the predetermined time interval is recorded.

8. The denoising method as claimed in claim 6, wherein the step of recording a brightness variation of the noise area for a predetermined time interval further comprises the steps of:
    identifying whether a brightness of the ambient light varies periodically according to the brightness variation of the noise area recorded within the predetermined time interval;
    identifying the brightness variation cycle when the brightness of the ambient light varies periodically; and
    acquiring a plurality of current images using the image sensor to accordingly determine a system parameter when the brightness of the ambient light does not vary periodically.

9. The denoising method as claimed in claim 5, wherein the step of recording a brightness variation of the noise area within a reference brightness variation cycle is to record a brightness value of the noise area in each of the images or a brightness difference of the noise area between every two neighboring images acquired by the image sensor within the reference brightness variation cycle.

10. The denoising method as claimed in claim 5, wherein the brightness variation of the noise area within the reference brightness variation cycle comprises a reference brightness variation of the noise area between any two neighboring images within the reference brightness variation cycle and a brightness ratio of the brightness variation of the noise area between other two neighboring images with respect to the reference brightness variation.

11. The denoising method as claimed in claim 10, wherein the reference brightness variation is a largest brightness variation of the noise area between two neighboring images within the reference brightness variation cycle.

12. The denoising method as claimed in claim 5, wherein the brightness variation of the noise area within the reference brightness variation cycle comprises an average brightness variation of the noise area between every two neighboring images acquired within the reference variation cycle and a brightness ratio of the brightness variation of the noise area between every two neighboring images with respect to the average brightness variation.

13. A denoising method of an image system, the method comprising:
  acquiring, using an image sensor, a plurality of images to determine at least one noise area;
  recording a brightness variation parameter and a phase parameter of the noise area within a reference brightness variation cycle; and
  compensating a brightness of the noise area in current images acquired by the image sensor according to the brightness variation parameter and the phase parameter, wherein
  the brightness variation parameter is one selected from the group consisting of
    (i) a brightness value of the noise area in each of the images acquired by the image sensor within the reference brightness variation cycle,
    (ii) a brightness difference of the brightness value of the noise area with respect to an average brightness value in each of the images acquired by the image sensor within the reference brightness variation cycle; and
    (iii) a brightness ratio of the brightness value of the noise area with respect to the average brightness value in each of the images acquired by the image sensor within the reference brightness variation cycle; and
  the phase parameter is a sampling phase of each of the images acquired by the image sensor within the reference brightness variation cycle.

14. The denoising method as claimed in claim 13, further comprising: recording a brightness variation of the noise area for a predetermined time interval so as to identify a brightness variation cycle of the noise area.

15. The denoising method as claimed in claim 13, wherein the acquiring comprises:
  identifying an image area in the images having a fixed brightness variation frequency as the noise area, or
  identifying an image area in the images having a brightness variation frequency identical to a predetermined brightness variation frequency as the noise area.

16. The denoising method as claimed in claim 13, wherein the acquiring comprises:
  acquiring two images using the image sensor; and
  calculating a difference of the two images to determine the at least one noise area in the images acquired.

17. The denoising method as claimed in claim 13, wherein the acquiring comprises:
  acquiring two current images, and
  calculating a current image difference, and the compensating comprises:
  retrieving a brightness variation of the noise area of two neighboring images in the reference brightness variation cycle corresponding to sampling phases of the two current images in a brightness variation cycle, and
  subtracting the retrieved brightness variation from the current image difference.

18. The denoising method as claimed in claim 13, further comprising:
  recording a brightness variation of the noise area for a predetermined time interval so as to identify whether the brightness variation of the noise area varies periodically.

19. An image system, comprising:
  at least one image sensor configured to continuously acquire images; and
  a processing unit configured to
    determine at least one noise area according to the images acquired by the image sensor,
    record a brightness variation parameter and a phase parameter of the noise area within a reference brightness variation cycle to accordingly compensate brightness of the noise area in current images,
    record a brightness variation of the noise area for a predetermined time interval, and
    identify whether brightness of ambient light varies periodically according to the brightness variation of the noise area recorded within the predetermined time interval.

20. The image system as claimed in claim 19, wherein the processing unit is configured to identify an image area in the images having a fixed brightness variation frequency as the noise area, or identify an image area in the images having a brightness variation frequency identical to a predetermined brightness variation frequency as the noise area.

21. A denoising method of an image system, the method comprising:
  acquiring, using an image sensor, a plurality of images to determine at least one noise area;
  recording a brightness variation parameter and a phase parameter of the noise area within a reference brightness variation cycle;
  acquiring two current images and calculating a current image difference;
  retrieving a brightness variation of the noise area of two neighboring images in the reference brightness variation cycle corresponding to sampling phases of the two current images in a brightness variation cycle; and
  subtracting the retrieved brightness variation from the current image difference.

22. The denoising method as claimed in claim 21, further comprising: recording a brightness variation of the noise area for a predetermined time interval so as to identify the brightness variation cycle of the noise area or identify whether the brightness variation of the noise area varies periodically.

23. The denoising method as claimed in claim 21, wherein the acquiring comprises:
  identifying an image area in the images having a fixed brightness variation frequency as the noise area, or
  identifying an image area in the images having a brightness variation frequency identical to a predetermined brightness variation frequency as the noise area.

24. The denoising method as claimed in claim 21, wherein the acquiring comprises:
  acquiring two images using the image sensor; and
  calculating a difference of the two images to determine the at least one noise area in the images acquired.

* * * * *